Feb. 20, 1951  H. L. ROSENTHAL  2,542,573
STALK FEEDER FOR CORN HARVESTERS
Filed Sept. 20, 1948  2 Sheets-Sheet 1

INVENTOR.
Henry L. Rosenthal
BY
Morsell & Morsell
ATTORNEYS.

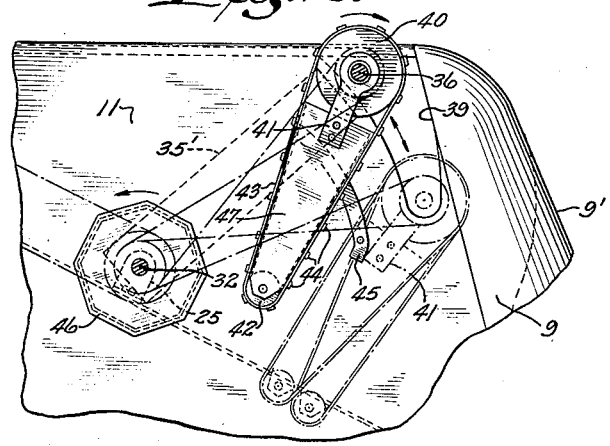
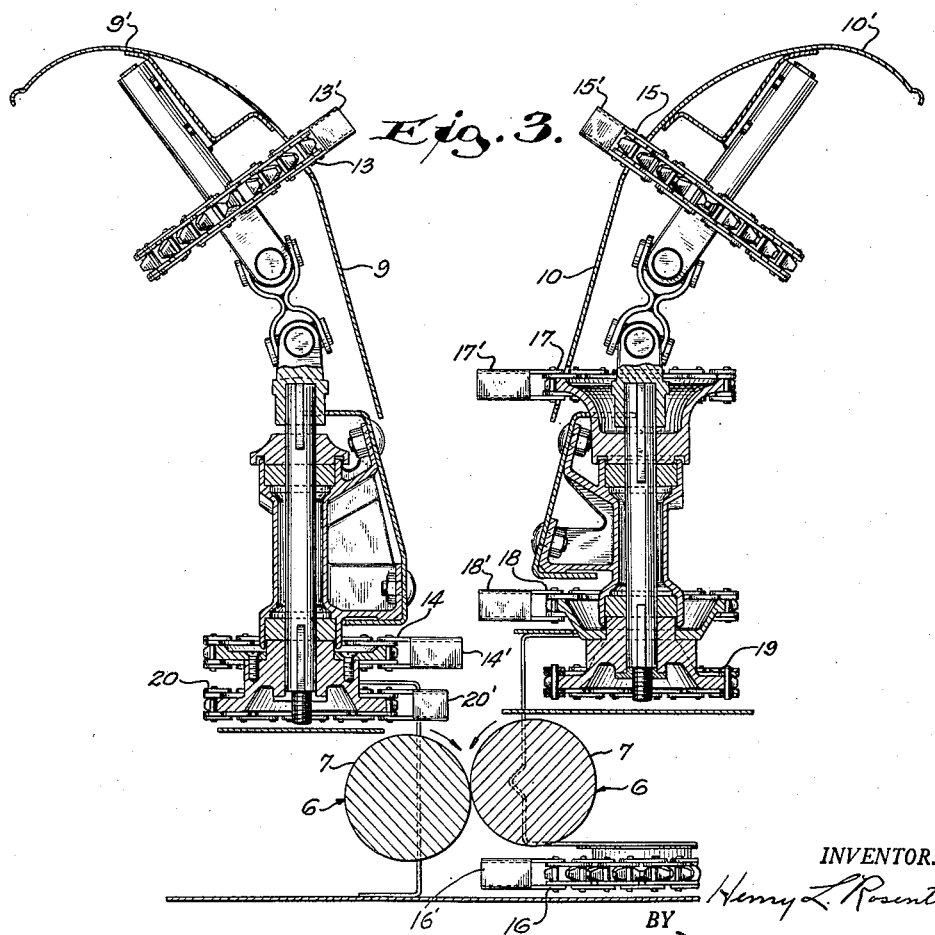

Patented Feb. 20, 1951

2,542,573

UNITED STATES PATENT OFFICE 2,542,573

STALK FEEDER FOR CORN HARVESTERS

Henry L. Rosenthal, Milwaukee, Wis., assignor to Henry L. Rosenthal, Paul H. Rosenthal, Lawrence E. Rosenthal, and Mabel A. Rosenthal, copartners doing business as Rosenthal Mfg. Co., Milwaukee, Wis.

Application September 20, 1948, Serial No. 50,032

14 Claims. (Cl. 56—18)

This invention relates to improvements in stalk feeders for corn harvesters and more particularly to mechanism for feeding stalks into the snapping rolls at a predetermined angle.

In a corn harvester having combination snapping and husking rolls, it is necessary for the proper operation of the machine that the stalks of corn, after being cut by the sickle knife, be delivered to the snapping rolls in a standing position which is substantially at right angles to the axes of said rolls. In a corn harvester wherein the husking portion of the upwardly inclined combination rolls are positioned inwardly of the snapping portions thereof, it is necessary that an ear forwarding chain be provided to transfer the ears which are separated from the stalks by the snapping portions of the rolls upwardly to the husking portions.

In an attempt to insure that the stalks will be fed into the snapping rolls at the proper angle, various expedients have been resorted to. As an example, my prior application, Serial No. 530,805, filed April 3, 1944 now Patent 2,501,097, issued March 21, 1950, discloses a fixed baffle or dam positioned above and at right angles to the snapping rolls and adjacent the upper ends thereof. This construction, however, is not entirely satisfactory because of the fact that occasionally the ear forwarding chains pull stalks of corn beneath the dam and onto the husking rolls. This of course, is undesirable as it greatly reduces the effectiveness of said rolls.

It is therefore a general object of the invention to provide a corn harvester of the type having combination snapping and husking rolls wherein is provided means for insuring that all of the corn stalks entering said harvester are delivered to and positively fed into the snapping rolls at a proper angle.

A further object of the invention is to provide a corn harvester of the class described having a floating endless cleated belt feeder mounted above the snapping rolls thereof, said belt having a downwardly moving stalk engaging extent which is at all times maintained at an angle of substantially 90° with respect to the snapping rolls.

A further object of the invention is to provide a floating feeder for a corn harvester, said feeder being capable of longitudinal movement relative to the snapping rolls, while at the same time acting to force the stalks in engagement therewith downwardly into said snapping rolls.

A further object of the invention is to provide a corn harvester of the class described having a floating feeder and having a rotary beater positioned adjacent the upper end of the snapping rolls, said beater being rotated in such a direction in conjunction with the floating feeder as to insure proper feeding of the stalks.

A further object of the invention is to provide a corn harvester of the class described wherein the floating feeder is mounted on a frame which is pivotally carried by the outer ends of a pair of spaced pivotally mounted supporting arms, said arms being adapted to pivot upwardly in response to rearwardly directed pressure on the forward extent of said feeder belt.

A further object of the invention is to provide a floating feeder of the class described having means for limiting the pivotal movement thereof about the end of the supporting arms, as well as means for limiting the swinging movement of said arms.

A further object of the invention is to provide a device of the class described which is strong and durable, which is efficient in operation, and which is otherwise well adapted for the purpose described.

With the above and other objects in view, the invention consists in the improved floating feeder for corn harvesters, and all of its parts and combinations, as set forth in the claims and all equivalents thereof.

In the drawing accompanying and forming a part of this specification, wherein is shown one complete embodiment of the preferred form of the invention, and wherein the same reference numerals indicate the same parts in all of the views:

Fig. 2 is an enlarged fragmentary side view of a portion of Fig. 1 with one side panel removed to show the floating feeder and the rotary beater, parts being shown in section; and Fig. 3 is an enlarged transverse sectional view taken along the line 3—3 of Fig. 1.

Figure 1:
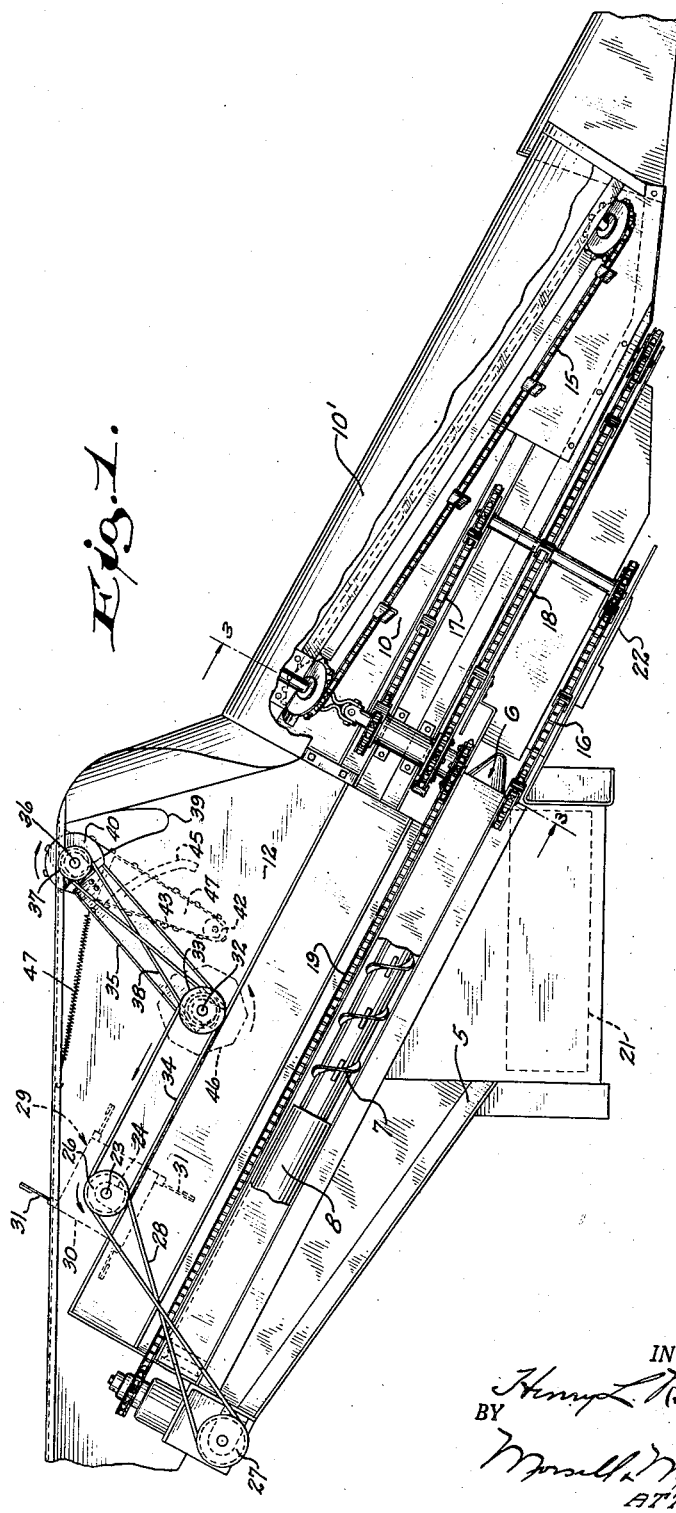
Fig. 1 is a fragmentary side view of a corn harvester embodying the invention.

Referring more particularly to the drawing the numeral 5 indicates a frame which is conventionally mounted on wheels (not shown). The frame 5 supports a pair of suitably driven combination husking and snapping rolls 6 which are now well known in the art. The rolls 6 extend longitudinally of the machine and incline downwardly toward their forward ends. The snapping portions are at the lower end of the rolls 6 and are designated by the numeral 7. The husking portions which are designated by the numeral 8 and which are at the upper ends thereof, may be constructed in the usual well known manner.

Supported on the frame 5 and extending forwardly thereon are a pair of spaced downwardly sloping side panel members 9 and 10. The panels 9 and 10 are outwardly curved along their upper edges as at 9' and 10' (see Fig. 3) and form a conventional stalk gathering trough. The panel members 9 and 10 at their upper ends merge respectively with a pair of spaced, substantially parallel side panels 11 and 12, as shown in Figs. 1 and 2, and as is also old in the art. The panel member 9 is provided with an upper gathering chain 13 and a lower gathering chain 14 (see Fig. 3). The panel member 10 is provided with an upper gathering chain 15 and a lower gathering chain 16, as well as with a pair of intermediate gathering chains 17 and 18. The gathering chains 13, 14, 15, 16, 17 and 18 are provided respectively with flights 13', 14', 15', 16', 17' and 18' which project inwardly of the panel members with which they are associated, and said chains normally move said flights upwardly and rearwardly along the inner extents thereof.

A drive chain 19 extends from the rear end of the frame 5 in line with the side panel 12 and powers the gathering chains 15, 16, 17 and 18 through the system of shafts and sprockets shown in Figs. 1 and 3. A second drive chain 20 extends from the rear end of the frame 5 in line with the side panel 11 and powers the gathering chains 13 and 14. The drive chain 20 is provided with flights 20' which are positioned to travel above one of the combination snapping and husking rolls 6, as shown in Fig. 3. The flights 20' act to forward ears which have been snapped from the stalks by the snapping rolls in a direction upwardly and rearwardly along said rolls to and over the husking rollers. The gathering chains 13, 14, 15, 16, 17 and 18 are well known in the art, and the ear forwarding chain 20 is shown in my prior application, Serial No. 530,805, filed April 13, 1944, now Patent No. 2,501,097 issued March 21, 1950. Other features of the above mentioned prior application which are also incorporated in the improved corn harvester are a suitably driven rotary cutter 21, which is positioned below the snapping rolls 7, and a suitably driven sickle knife 22 which is positioned below and adjacent the lower end of the gathering chain 16. The rotary cutter 21 is for the purpose of cutting the stalks into fodder, and the sickle knife 22 is for the purpose of severing the stalk near the ground as the machine moves along a row of corn.

A transversely extending rotatable shaft 23 extends through and between the panels 11 and 12 above the rolls 8 and is suitably journalled near each end in bearings 24 and 25 carried by said panels. A pair of pulleys 26 are fixedly mounted on one end of the shaft 23 and one of said pulleys is preferably connected by means of a V-belt 28 to a driving pulley 27 mounted adjacent the upper end of the frame 5. Fixed to the shaft 23 between the panels 11 and 12 is a combination husking brush and beater 29. The combination husking brush and beater 29 consists of a substantially square hub portion 30 from which project blades or brushes 31 formed of leather, rubber or other suitable flexible material. The brushes 31 act to prevent separated ears of corn from travelling up the husking rolls 8 one above the other and insures that the rolls 8 operate on each ear. In addition, the brushes 31 act to loosen the husks from the ears of corn to thereby additionally aid the rolls 8 in their husking function.

A second transversely extending shaft 32 is mounted similarly to the mounting of the shaft 23 above the rolls 7. Fixed to an outer end of the shaft 32 is a pair of pulleys 33, one of which is preferably connected to the second pulley 26 on the shaft 23 by means of a V-belt 34, as shown in Fig. 1.

Freely mounted at one end on the shaft 32 and positioned exteriorly of the panels 11 and 12 are a pair of like supporting arms 35 and 35' (see Figs. 1 and 2). The arms 35 and 35' may be in the form of a channel member as shown in Fig. 1. Rotatably carried by the outer ends of the arms 35 and 35' is a transverse shaft 36. The shaft 36 is provided with a pulley 37 fixed thereon exteriorly of the arm 35, and the pulley 37 is preferably connected to the second pulley 33 on the shaft 32 by a V-belt 38 having a reverse twist therein as shown in Fig. 1. The panels 11 and 12 are each formed with an arcuate aperture 39 therein which permits the passage of the shaft 36 therethrough. The aperture 39 is shaped to permit limited swinging movement of the arms 35 and 35' for a purpose to be hereinafter described. A coiled spring 47 preferably connects the upper end of the arm 35 with an upper edge portion of the panel 12 to retard downward movement of the assembly supported by the arms 35 and 35'.

Fixed to a central portion of the shaft 36 is a wheel or pulley 40. Freely rotatable on the shaft 36 and positioned on each side of the wheel 40 between said wheel and the upper ends of the supporting arms 35 and 35', are a pair of spaced brackets 41. The brackets 41 are fixed to a boxlike frame 47 which is widest adjacent the wheel 40 and tapers toward the opposite end wherein is journalled a freely rotatable smaller pulley or wheel 42. Extending around the wheels 40 and 42 is an endless flat feeder belt 43 of rubber, leather or other suitable material, which is provided with spaced cleats 44, on the exterior surface thereof. The feeder 43 is sufficiently wide to extend transversely substantially the whole distance between the panels 11 and 12.

Fixed to the inner surfaces of the panels 11 and 12, adjacent the lower ends of the brackets 41 and in contact therewith, are a pair of stops and guides 45. By reason of the engagement of the brackets 41 with the stops and guides 45, the forward extent of feeder belt 43 is maintained at substantially a right angle to the rolls 6, regardless of the position of the swingable supporting arms 35 and 35'. It is apparent that the combination of the arms 35 and 35', the frame 47 and the endless belt 43 provides a floating feeder assembly which will operate in a variety of positions while maintaining a substantially constant angular position of the belt 43.

Fixedly mounted on the rotatable shaft 32 between the panels 11 and 12 is a central beater 46. The beater 46 is preferably of box-like construction and is preferably octagonal, as shown. The beater 46 is rotated in a counterclockwise direction as viewed in Figs. 1 and 2. As is apparent from Figs. 1 and 2 the wheels 40 and 42 associated with the feeder belt 43 travel in a reverse direction to that of the beater 46, and consequently the forward extent of the feeder belt 43 normally travels in a downwardly direction.

In operation, as the improved corn harvester moves along a row of corn, the panels 9 and 10 of the gathering trough pass on opposite sides of the row, and the gathering chains 13 to 18 urge the stalks into said trough in the usual manner. The sickle knife 22 severs said stalks near the ground, and the gathering chains deliver the stalks to the snapping rolls 7 in a standing position which is at substantially a right angle to said rolls. At this time the floating feeder assembly is in the lower or forward position shown in the dot and dash lines of Fig. 2.

As the severed stalks of corn are pushed upwardly by the feeder chains, they are forced between the panels 11 and 12, and they then come in contact with the belt 43 and with the snapping rolls 7. The snapping rolls are suitably rotated in the direction indicated in Fig. 3, and they tend to pull the stalks downwardly therethrough. By coming in contact with the downwardly moving forward extent of the belt 43, the stalks are positively urged downwardly into contact with and between the rolls 7. It will be noted that, since the forward extent of the belt 43 is at all times maintained at substantially a right angle to the rolls 7, the stalks are therefore positively urged into said rolls by said belt at substantially the same angle.

Since the number of stalks cut by the improved corn harvester may vary due to the fluctuations in the crop harvested, provision is made for compensating for said variations. The floating feeder is normally held by the force of gravity in the forward dot and dash line position of Fig. 2 referred to above.

When the number of stalks pushed up into contact with the belt 43 increases, they act to push the floating feeder rearwardly, causing a swinging of the supporting arms 35 and 35' about their lower pivoted ends to the full line position of Fig. 1. This makes room for more stalks between the panels 11 and 12 and forwardly of the belt 43. As previously mentioned, the coaction of the brackets 41 with the stops and guides 45 maintains the belt 43 at substantially the same angle relative to the rolls 7 regardless of the position of the feeder assembly as a whole. When the number of stalks delivered by the gathering chains decreases, the floating feeder will again swing forwardly by force of gravity to an automatically adjusted position.

Since the central beater 46 is rotating in a counter clockwise direction, if the lower ends of any stalks should be accidentally pulled rearwardly under the lower end of the belt 43 by the ear forwarding chain 20, the beater 46 will tend to urge said stalk ends forwardly. The combined forward urging of the beater 46 and the downward urging of the belt 43 serves to force the wayward stalks downwardly through the rolls 7, thereby preventing them from passing over the husking rolls 8.

As the ears of corn are snapped off of the stalks by the snapping rolls 7, the separated ears are moved upwardly along the rolls 7 to the husking rolls 8 by the ear forwarding chain 20. The ears are husked as they travel over the rolls 8 and ultimately pass out over the upper ends of the rolls 8 into a suitable conveyor (not shown) in a manner well known in the art. After passing through the rolls 7, the stalks are chopped into fodder by the cutter 21 and then conveyed from the machine in a manner also well known in the art.

It is apparent from the foregoing description that the invention provides a novel way of insuring that all of the stalks cut by the improved machine pass through the snapping rolls 7, and that none of them pass over the husking rolls to decrease the efficiency thereof. By reason of the floating mounting of the feeder, the latter automatically adjusts itself to variations in the number of stalks which are in contact therewith, and at all times maintains the desired angular relationship with the snapping rolls.

Various changes and modifications may be made without departing from the spirit of the invention, and all of such changes are contemplated as may come within the scope of the claims.

What I claim is:

1. In a corn harvester having a pair of rotatable snapping rolls and having feeder mechanism for delivering severed stalks in an upright position to said rolls; means including an endless feeder belt positioned above said rolls for urging said stalks downwardly into the bite of said snapping rolls.

2. In a corn harvester having a pair of rotatable snapping rolls and having feeder mechanism for delivering severed stalks in an upright position to said rolls; means including an endless feeder belt positioned above said rolls and having a stalk engaging portion which extends at an angle of substantially ninety degrees with respect to said rolls for urging said stalks downwardly into the bit of said snapping rolls.

3. In a corn harvester having a pair of rotatable snapping rolls and having feeder mechanism for delivering severed stalks in an upright position to said rolls; an endless feeder belt positioned above said rolls having an extent engageable with said stalks for urging said stalks downwardly into the bite of said snapping rolls; movable means for supporting said belt in a manner to permit movement thereof longitudinally of said rolls, and guide means coacting with said supporting means for maintaining the stalk engaging extent of said belt at substantially a right angle to said rolls.

4. In a corn harvester having a pair of rotatable snapping rolls, a pair of substantially parallel side panels extending upwardly from said rolls, and feeder mechanism for delivering severed stalks in an upright position to said rolls and between said panels; an endless feeder belt positioned above said rolls and between said panels and having an extent engageable with said stalks for urging said stalks downwardly into the bite of said snapping rolls; and movable means for supporting said belt in a manner to permit movement thereof longitudinally of said rolls, and guide means coacting with said supporting means for maintaining the stalk engaging extent of said belt at substantially a right angle to said rolls.

5. In a corn harvester having a pair of rotatable snapping rolls, a pair of substantially parallel side panels extending upwardly from said rolls, and feeder mechanism for delivering severed stalk in an upright position to said rolls and between said panels; an endless feeder belt positioned above said rolls and between said panels and having an extent engageable with said stalks for urging said stalks downwardly into the bite of said snapping rolls; and movable means carried by said side panels for supporting said belt in a manner to permit movement thereof longitudinally of said rolls, and guide means coacting with said supporting means for maintaining the stalk engaging extent of said belt at substantially a right angle to said rolls.

6. In a corn harvester having a pair of rotatable snapping rolls, a pair of substantially parallel side panels extending upwardly from said rolls, and mechanism for feeding severed stalks in an upright position to said rolls and between said panels; an elongated frame having a pulley rotatably mounted at each end thereof positioned above said rolls and between said panels; an endless feeder belt extending around said pulleys and having a stalk engaging extent for urging said stalks downwardly into the bite of said snapping rolls; swingable means mounted adjacent said side panels for supporting said frame in a manner to permit movement thereof longitudinally of said rolls; and cooperating guide means on said panels and said frame for maintaining the stalk engaging extent of said belt at substantially a right angle to said rolls.

7. In a corn harvester having a pair of rotatable snapping rolls, a pair of substantially parallel side panels extending upwardly from said rolls, and mechanism for feeding severed stalks in an upright position to said rolls and between said panels; an elongated frame having a pulley rotatably mounted at each end thereof positioned above said rolls and between said panels; an endless feeder belt extending around said pulleys and having a stalk engaging extent for urging said stalks downwardly into the bite of said snapping rolls; a pair of arms mounted adjacent said side panels for supporting said frame in a manner to permit movement thereof longitudinally of said rolls; and cooperating guide means on said panels and said frame for maintaining the stalk engaging extent of said belt at substantially a right angle to said rolls.

8. In a corn harvester having a pair of rotatable snapping rolls, having a pair of substantially parallel side panels extending upwardly from said rolls, and having mechanism for feeding severed stalks in an upright position to said rolls and between said panels; an elongated frame having a pulley rotatably mounted at each end thereof positioned above said rolls and between said panels; an endless feeder belt extending around said pulleys and having a stalk engaging extent for urging said stalks downwardly into the bite of said snapping rolls; a pair of swingable arms mounted adjacent said side panels and pivotally connected to said frame; and cooperating guide means on said panels and said frame for maintaining the stalk engaging extent of said belt at substantially a right angle to said rolls.

9. In a corn harvester having a pair of rotatable snapping rolls, a pair of substantially parallel side panels extending upwardly from said rolls, and mechanism for feeding severed stalks in an upright position to said rolls and between said panels; an elongated frame having a pulley rotatably mounted at each end thereof positioned above said rolls and between said panels; and endless feeder belt extending around said pulleys and having a stalk engaging extent for urging said stalks downwardly into the bite of said snapping rolls; a pair of swingable arms mounted adjacent said side panels and pivotally connected to one end of said frame; and cooperating guide means on said panels and said frame for maintaining the stalk engaging extent of said belt at substantially a right angle to said rolls.

10. In a corn harvester having a pair of rotatable snapping rolls, having a pair of substantially parallel side panels extending upwardly from said rolls, and having mechanism for feeding severed stalks in an upright position to said rolls and between said panels; an elongated frame having a pulley rotatably mounted at each end thereof positioned above said rolls and between said panels; an endless feeder belt extending around said pulleys and having a stalk engaging extent for urging said stalks downwardly into the bite of said snapping rolls; a pair of swingable arms mounted adjacent said side panels and pivotally connected to one end of said frame; cooperating guide means on said panels and said frame for maintaining the stalk engaging extent of said belt at substantially a right angle to said rolls; and means for limiting the swinging movement of said arms.

11. In a corn harvester having a pair of rotatable snapping rolls, having a pair of substantially parallel side panels extending upwardly from said rolls, and having mechanism for feeding severed stalks in an upright position to said rolls and between said panels; a rotary beater mounted between said panels and above said rolls; an elongated frame having a pulley rotatably mounted at each end thereof positioned above said rolls and between said panels; and endless feeder belt extending around said pulleys and having a stalk engaging extent for urging said stalks downwardly into the bite of said snapping rolls; a pair of swingable arms pivotally mounted with one end adjacent said beater and pivotally connected at the other end to said frame; and cooperating guide means on said panels and said frame for maintaining the stalk engaging extent of said belt at substantially a right angle to said rolls.

12. In a corn harvester having a pair of forwardly sloping rotatable snapping rolls, having a pair of substantially parallel side panels extending upwardly from said rolls, and having mechanism for feeding severed stalks in an upright position to said rolls and between said panels; a rotary beater mounted between said panels and above said rolls; an elongated frame having a pulley rotatably mounted at each end thereof positioned above said rolls and between said panels and forwardly of said beater; an endless feeder belt extending around said pulleys and having a stalk engaging extent for urging said stalks downwardly into the bite of said snapping rolls; a pair of swingable arms pivotally mounted with one end adjacent said beater and pivotally connected at the other end to one end of said frame; and cooperating guide means on said panels and said frame for maintaining the stalk engaging extent of said belt at substantially a right angle to said rolls.

13. In a corn harvester having a pair of forwardly sloping rotatable snapping rolls, having a pair of substantially parallel side panels extending upwardly from said rolls, and having mechanism for feeding severed stalks in an upright position to said rolls and between said panels; a rotary beater mounted between said panels and above said rolls; an elongated frame having a pulley rotatably mounted at each end thereof positioned above said rolls and between said panels and forwardly of said beater; an endless feeder belt extending around said pulleys and having a stalk engaging extent for urging said stalks downwardly into the bite of said snapping rolls; a pair of swingable arms pivotally mounted with one end adjacent said beater and pivotally connected at the other end to one end of said frame; cooperating guide means on said panels and said frame for maintaining the stalk engaging extent of said belt at substantially a right angle to said rolls; and means for limiting the swinging movement of said arms.

14. In a corn harvester having a pair of forwardly sloping rotatable snapping rolls, having a pair of substantially parallel side panels extending upwardly from said rolls, and having mechanism for feeding severed stalks in an upright position to said rolls and between said panels; a rotary beater mounted between said panels and above said rolls; an elongated frame having a pulley rotatably mounted at each end thereof positioned above said rolls, between said panels, and forwardly of said beater; an endless feeder belt extending around said pulleys and having a stalk engaging extent for urging said stalks downwardly into the bite of said snapping rolls; a pair of swingable arms pivotally mounted with one end adjacent said beater and pivotally connected at the other end to one end of said frame; cooperating guide means on said panels and said frame for maintaining the stalk engaging extent of said belt at substantially a right angle to said rolls; and means for limiting the swinging movement of said arms, said rotary beater being rotatable in a direction opposite to the direction of rotation of said frame pulleys.

HENRY L. ROSENTHAL.

REFERENCES CITED

The following references are of record in the file of this patent:

UNITED STATES PATENTS

| Number | Name | Date |
|---|---|---|
| 1,936,760 | Hitchcock | Nov. 28, 1933 |
| 1,952,507 | Lindgren et al. | Mar. 27, 1934 |
| 2,217,872 | Lindgren et al. | Oct. 15, 1940 |
| 2,293,757 | Jochumsen | Aug. 25, 1942 |
| 2,333,901 | Swenson | Nov. 9, 1943 |